United States Patent
Pasquali

(10) Patent No.: US 11,146,393 B2
(45) Date of Patent: Oct. 12, 2021

(54) METHOD FOR ENCODING AND DECODING DATA BY VARYING THE DISTINCTIVE CHARACTERISTICS OF AN OPTICAL RADIATION, ENCODING DEVICE AND DECODING SYSTEM

(71) Applicant: SLUX SAGL, Riva San Vitale (CH)

(72) Inventor: Alessandro Pasquali, Riva San Vitale (CH)

(73) Assignee: SLUX Sagl, Riva San Vitale (CH)

( * ) Notice: Subject to any disclaimer, the term of this patent is extended or adjusted under 35 U.S.C. 154(b) by 107 days.

(21) Appl. No.: 16/630,434

(22) PCT Filed: Jul. 11, 2018

(86) PCT No.: PCT/IB2018/055102
§ 371 (c)(1),
(2) Date: Jan. 11, 2020

(87) PCT Pub. No.: WO2019/012441
PCT Pub. Date: Jan. 17, 2019

(65) Prior Publication Data
US 2020/0145205 A1    May 7, 2020

(30) Foreign Application Priority Data

Jul. 11, 2017  (CH) .................................. 00895/17
Aug. 2, 2017  (IT) ........................ 102017000089136

(51) Int. Cl.
*H04L 9/08* (2006.01)
*H04K 1/04* (2006.01)
(Continued)

(52) U.S. Cl.
CPC ............. *H04L 9/0858* (2013.01); *H04K 1/04* (2013.01); *H04K 1/08* (2013.01); *H04L 9/0618* (2013.01)

(58) Field of Classification Search
CPC ....... H04L 9/0858; H04L 9/0618; H04K 1/04; H04K 1/08
See application file for complete search history.

(56) References Cited

U.S. PATENT DOCUMENTS

| | | | |
|---|---|---|---|
| 10,292,263 B2* | 5/2019 | Rogers | H05K 3/285 |
| 2008/0055581 A1* | 3/2008 | Rogers | B82Y 10/00 |
| | | | 355/95 |

FOREIGN PATENT DOCUMENTS

| | | | |
|---|---|---|---|
| WO | 02/23794 A2 | 3/2002 | |
| WO | WO-0223794 A2 * | 3/2002 | ............... H04K 1/08 |
| WO | 2016/188791 A1 | 12/2016 | |

OTHER PUBLICATIONS

European Patent Office as International Searching Authority; International Search Report for PCT/IB2018/055102; European Patent Office, P.B. 5818 Patentlaan2, NL—2280 HV Rijswijk; dated Oct. 31, 2018.
(Continued)

*Primary Examiner* — Hee K Song
(74) *Attorney, Agent, or Firm* — Underwood & Associates, LLC

(57) ABSTRACT

Encoding element (100) at least selectively transparent to an infrared or ultraviolet light radiation, incident thereon on a first incidence surface (101), wherein—in the volume defined by said encoding element (100)—a plurality of areas (104) is provided, previously selected and arranged according to a predefined pattern wherein at least one polarisation characteristic of the optical radiation (200) that is incident thereon is varied, wherein the variation of said polarisation characteristic of said incident radiation is varied according to a localised alteration pattern biunivocally associated to a predefined ciphering key, and wherein said plurality of areas is arranged between said first incidence surface (101) on which said infrared or ultraviolet light radiation is incident
(Continued)

in use, and a second output surface (102) of said infrared or ultraviolet light optical radiation.

17 Claims, 3 Drawing Sheets

(51) Int. Cl.
    *H04K 1/08*     (2006.01)
    *H04L 9/06*     (2006.01)

(56)     References Cited

OTHER PUBLICATIONS

European Patent Office as International Searching Authority; Written Opinion of the International Searching Authority for PCT/IB2018/055102; European Patent Office, D-80298 Munich; dated Oct. 31, 2018.

\* cited by examiner

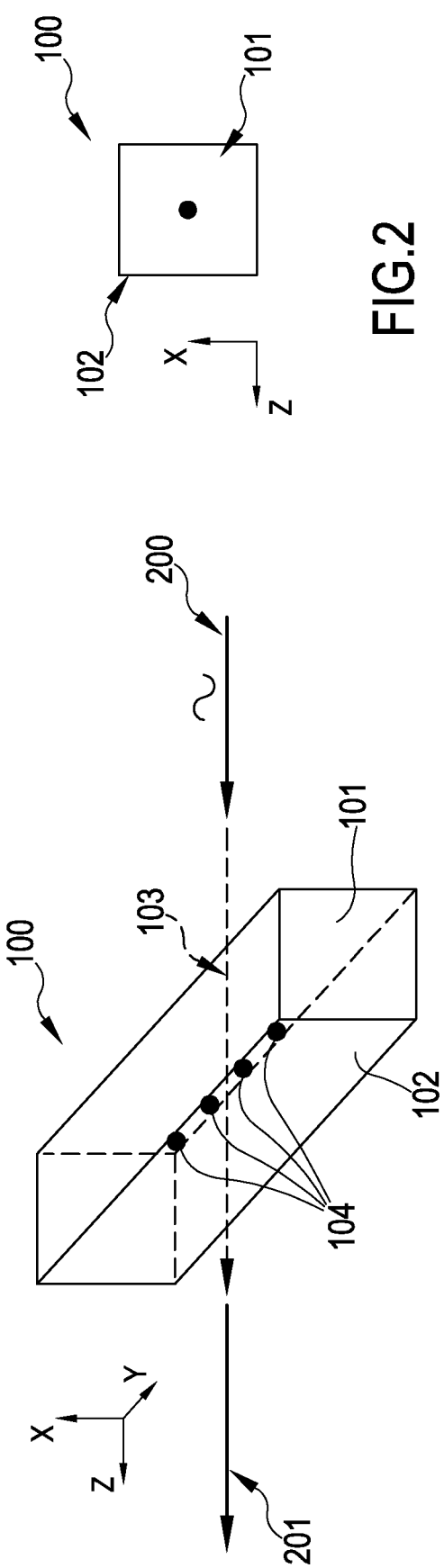

METHOD FOR ENCODING AND DECODING DATA BY VARYING THE DISTINCTIVE CHARACTERISTICS OF AN OPTICAL RADIATION, ENCODING DEVICE AND DECODING SYSTEM

FIELD OF THE INVENTION

The present invention regards data coding and decoding systems. More in particular, the present invention regards a data coding and decoding method by varying the distinctive characteristics of an optical radiation, and it further regards an encoding device and a data decoding system by varying the distinctive characteristics of an optical radiation.

STATE OF THE ART

For quite some time now, with the increase of the amount of data exchanged electronically between two or more users there has arisen the problem related to the security thereof, irrespective of the method of transmission. For several decades, there have been known data coding and decoding methods aimed at ciphering a data of origin which represents the unencrypted text turning it into a ciphered message, with the aim of making it impossible to correctly decipher it unless by means of a key, which should be theoretically exclusively in the possession of the right end user, authorised to perform the deciphering.

Depending on various means with which the ciphered message is ciphered, some drawbacks can be observed. In particular, the applicant observed that ciphering by transmitting on a wireless channel has always been subject to fraudulent receipt by non-authorised users. The full receipt of a ciphered message can be subject of brute force attacks aimed at deciphering the content—the unencrypted text that is—without any access to the key whatsoever and without guides therefor.

Storage methods aimed at enabling storage of ciphered data are currently available. Such storage devices reveal a limit lying in their physical dimension and they are subject to possible malfunctioning if subjected to unfavourable environments such as for example but not limitedly high environmental temperatures, humidity or—even worse— submersion, ionising radiations or interferences or electromagnetic pulses. Should the environmental conditions be unfavourable, the ciphered message is corrupted, and the end user can no longer recover the correct unencrypted text even though the user has the correct decoding key. Furthermore, with some types of ciphering algorithm, the correct text could be wholly jeopardised even though for example only part of said memory has been corrupted.

The object of the present invention is to describe a data coding and decoding method without the drawbacks outlined above.

The object of the present invention is also to describe a data encoding element without the drawbacks outlined above.

Furthermore, the object of the present invention is to describe a data decoding system without the drawbacks outlined above.

SUMMARY OF THE INVENTION

According to the present invention, is described herein a data ciphering method, said method comprising:

- a step of generating a localised alteration pattern of one or more selected areas of an encoding element at least selectively transparent to luminous, infrared or ultraviolet radiation;
- a step of processing said encoding element at least selectively transparent to infrared or ultraviolet light radiation, wherein in said step for processing the selected areas of said crystalline element or said encoding element at least selectively transparent encoding element are selectively altered according to said localised alteration pattern, and wherein, with said selective alteration of said selected areas is varied at least one distinctive characteristic of an optical radiation incident and passing through said encoding element,
- said step of processing leading to a permanent modification of the characteristic of said element at least selectively transparent such to obtain a storing of a ciphered message or a ciphering key for an unencrypted message;
- a step of irradiating said encoding element with a luminous, infrared or ultraviolet radiation that is incident on said encoding element at a first input, or incidence, surface so that this optical radiation passes in the encoding element through at least one of said areas, up to a second output surface.

According to a first non-limiting aspect of the present invention, said distinctive characteristic of said incident radiation that is varied, in particular through the processing step, is a polarisation characteristic.

More in particular, the varied incident radiation distinctive characteristic is a polarisation angle.

According to a further non-limiting aspect of the invention, said localised alteration is a heating followed by a natural or induced cooling.

Alternatively, or combined with the preceding aspect, said distinctive characteristic of said incident radiation that is varied is a spectrum characteristic. Preferably but not limitedly, such spectrum is an absorption spectrum or an emission spectrum. In such case, localised alteration is obtained by introducing a second different material with respect to the material that said element is made of.

According to a further non-limiting aspect of the present invention, said method comprises:

- a step of generating a ciphering key for an unencrypted message,
- a step of allocating a biunivocal association of said ciphering key to said localised alteration pattern of one or more selected areas of an encoding element.

According to a further non-limiting aspect of the present invention, said selective alteration of said selected areas comprises a step of heating at least one area fully located within the volume defined by said element at least selectively transparent to luminous, infrared or ultraviolet radiation. In particular, such heating determines a modification of the distinctive characteristics of the material which causes a variation of the polarisation characteristics of the optical radiation which passes through said at least one area.

Advantageously, thus by so doing, the area that is heated locally to vary the its polarisation characteristics for the incident optical radiation, and specifically its polarisation angle, is protected by a determined thickness of the element on the three dimensions taken by the latter, and it is thus less subjected to the risk of alteration due to mechanical or chemical actions typical of the external environment, even in aggressive atmosphere.

According to a further non-limiting aspect of the present invention, said method comprises a step of ciphering said unencrypted message by means of a predefined ciphering algorithm, using the aforementioned ciphering key.

Such ciphering step is preferably carried out by processing electronic data carried out by a data processing unit.

In particular, said ciphering by means of a data processing unit comprises a step of at least temporary storage in a medium for the non-transitory storage of the ciphered message using said ciphering key. Thus, the ciphered message M follows the $M=f_k(c)$ law where k is the ciphering key, c is the unencrypted message and f is the cryptography function.

According to a further non-limiting aspect of the present invention, said processing step comprises a step of localised heating of said areas by means of a laser.

More in particular, said step of localised heating by means of a laser is a Sub-Surface Laser Engraving (SSLE) step.

According to a further non-limiting aspect of the present invention, said pattern is a localised heating pattern which defines a pattern of a plurality of points of variation of said distinctive characteristic of the incident optical radiation and passing through said at least selectively transparent element in at least one first direction defining a preferential optical path between said first and said second surface respectively of input, or incidence, and output.

According to a further non-limiting aspect of the present invention, when dependent on the preceding aspect, said localised heating pattern defines a pattern of a plurality of points for varying said polarisation characteristic of said radiation that is incident and passing through said element at least selectively transparent on a first and on a second direction.

This advantageously enables obtaining patterns which—if observed parallel with respect to the incidence direction, take a matrix form and advantageously enable to define keys or messages more dense and complex.

According to a further non-limiting aspect of the present invention, said localised heating pattern is defined based on the amount of energy injected into said selected areas. In other words, the degree of rotation of the polarisation angle induced by the alteration in the material caused by said localised heating can be function of at least the amount of energy injected into said selected areas.

In particular, said energy injected into said selected areas is obtained from a combination of an energy injection instantaneous power and an injection time.

According to a further non-limiting aspect of the present invention, combined with the preceding aspect, said localised heating pattern is further defined as an injection volume pattern of said amount of energy.

Advantageously, Applicant observed that suitably dosing the amount of energy introduced per volume unit enables obtaining alterations of the material even invisible to the naked eye, and this in turn enables obtaining products apparently without any technical function but otherwise provided with cryptography and decryption function.

According to a further non-limiting aspect of the present invention, said method comprises a step of arranging said encoding element along a direction so that the variation of the polarisation characteristics of the light is reversible when said element is arranged along an opposite direction with respect to the previous direction, and said processing step is carried out so that said pattern of said plurality of variation points of said polarisation characteristic of said optical radiation that is incident and passing through said at least selectively transparent encoding element is spatially oriented according to said arrangement.

According to a further aspect of the present invention, said method comprises a step of processing the aforementioned encoding element so that in the volume defined by the latter, and in particular along at least one preferential optical path, a second different material is present with respect to the material that the remaining part of said encoding element is made of, said different or second material, having a distinctive radiation transmission curve or spectrum. Should a transversal symmetry be complied with, this advantageously enables obtaining said device which enables ciphering as a deciphering key too.

According to a further non-limiting aspect of the present invention, the variation of said polarisation angle is independent from the frequency of said incident radiation.

According to the present invention, is herein described a data deciphering method, said method comprising:

a step of arranging an encoding element having a plurality of areas with a varied distinctive characteristic of an incident optical radiation and/or varying a distinctive characteristic of an optical radiation incident thereon, wherein said varied distinctive characteristic of an incident optical radiation is previously defined based on a localised alteration pattern of said element with a biunivocal association with a ciphering key of an unencrypted message on a known cyphering function, in correspondence of a radiation source, in a position such that said radiation, by being incident on the surface of said encoding element, passes through said plurality of areas with a varied distinctive characteristic of an incident optical radiation, producing in output of said encoding element a message ciphered under electromagnetic radiation;

a step of arranging at least one photoreceiver in a direction for propagating said radiation through said encoding element wherein said photoreceiver element is configured so as to directly or indirectly perceive at least one variation of the characteristics of said radiation in correspondence of said areas with a varied distinctive characteristic of an incident optical radiation and/or varying a distinctive characteristic of an optical radiation incident thereon;

a step of extracting information from the radiation exiting from said encoding element based on a reconstruction of said alteration.

According to a further non-limiting aspect of the invention, the extraction step is carried out through said photoreceiver.

According to a further non-limiting aspect of the invention, said extraction step comprises:

a step of extracting, by means of said at least one photoreceiver, a polarization angle of said radiation exiting from said encoding element, wherein said polarization angle is associated with said ciphered unencrypted message, said extraction step corresponding to a step of decrypting said ciphered message associated with said radiation exiting from said encoding element.

According to a further non-limiting aspect, said photoreceiver can be sensitive to one or more from among infrared, ultraviolet and visible radiations.

According to a further non-limiting aspect of the present invention, said method further comprises a step of comparing said polarization angle of said radiation exiting from said encoding element with a ciphering key electronically biunivocally associated with a rotation of said polarization angle, due to the passing of said radiation through at least said encoding element, wherein the unencrypted message is electronically extracted from said comparing step.

In particular, the previously described decoding method enables obtaining a function for the "optical" reading of an ciphered message, both in cases where—by means of the localised alteration pattern—the actual ciphered message is permanently indicated on the element and in cases where only the ciphering key is indicated on the element.

In particular, according to a non-limiting aspect of the present invention, through said localised heating pattern, a variation of the polarisation characteristic of said incident radiation corresponding to the ciphered message is indicated on said areas with a varied distinctive characteristic of an incident optical radiation.

This advantageously enables decoding said ciphered message based on a time-invariant lighting, for example generated by a simple radiation source, for example and not limitedly luminous—or by a plurality of light sources—preferably but not limitedly fed with direct current. Such radiation source may equally be of the infrared or ultraviolet type.

In a further non-limiting aspect of the present invention, through said localised heating pattern, a variation of the polarisation characteristic of said incident radiation corresponding to the ciphered message is indicated on said areas with a varied distinctive characteristic of an incident optical radiation corresponding to said ciphering key. This advantageously enables proceeding to receive the ciphered message and the subsequent decryption thereof by applying a radiation source suitably modulated over time according to said unencrypted message. The applicant observed that in this case, despite at the cost of greater complexity on the incident radiation, the encoding element does not carry any sensitive information thus solely becoming a cryptography means, thus possibly being suitable to be used for any type of sources.

According to a further non-limiting aspect of the present invention, said method comprises a step of interposing at least one polarisation filter between said at least one photoreceiver and said encoding element.

Said polarisation filter advantageously enables increasing the security of the message transmitted between said encoding element and said photoreceiver, given that it adds a second key, which additionally depends on the rotation thereof with respect to a reference polarisation angle.

According to a further non-limiting aspect of the present invention, said method comprises step of the spectroscopic analysis of said radiation that is incident on said at least one photoreceiver; said step of decrypting said ciphered message transmitted with said light radiation comprising a step of applying a comparison of at least one from among a set of predefined spectroscopic patterns on the spectroscopic pattern received from said at least one photo-receiver, in order to obtain said unencrypted message.

According to a further aspect of the present invention, in said method said encoding element is lit using a radiation source emitting on a wavelengths spectrum with a predefined profile.

Preferably but not limitedly, such profile has a constant amplitude.

This advantageously also enables realizing radiation sources that per se in turn have a ciphering key obtained from the profile contained in the transmitted wavelengths spectrum with respect to a reference profile. In this case, the communication system as conceived through the encryption and decryption method has a dual security.

According to a further non-limiting aspect of the present invention, said pattern is a localised alteration pattern which defines a pattern of a plurality of points for varying said distinctive characteristic of an incident optical radiation and passing through said element at least selectively transparent at least in a first direction.

According to a further non-limiting aspect of the present invention, when dependent on the preceding aspect, said localised alteration pattern defines a pattern of a plurality of points for varying said polarisation characteristic of said radiation that is incident and passing through said element at least selectively transparent on a first and on a second direction.

This advantageously enables obtaining a pattern which—if observed parallel with respect to the incidence direction—take a matrix form and advantageously enable to define more dense and complex keys or messages.

In detail, the number of preferential optical sub-paths of said preferential optical path matches the number of areas.

The applicant advantageously observed that a radiation transmission—or even absorption or emission—curve, which selectively attenuates radiation as a function of the frequency can be used as a further key for ciphering the unencrypted message or as a replacement key alternative top varying the radiation polarisation characteristics of the incident optical radiation.

In detail, the processing step leads to the fact that the radiation exiting from the second surface simultaneously or alternatively has:

an alteration of the polarization angle; and
an alteration of the frequency spectrum thereof, in accordance with the radiation transmission—or even absorption or emission—curve of said material of different type with respect to the first material that the remaining part of said encoding element is made of.

Said material of different or heterogeneous or second material type can be:

spatially positioned in correspondence of the areas, i.e. the areas are obtained in the volume of the encoding element through an alteration obtained by heating and subsequently cooling the heterogeneous material or second material; or
spatially separated with respect to the areas; or
be directly injected into said areas.

According to a further non-limiting aspect of the invention, said material is obtained in form of a layer interposed between two layers of the material of said encoding element.

According to a further non-limiting aspect of the invention, said material of different or heterogeneous or second material type is a fluorescent material. Such material has a distinctive emission spectrum.

According to a further non-limiting aspect of the invention, said material of different or heterogeneous or second material type is a material characterised by a distinctive absorption spectrum.

According to the present invention, herein described is an encoding element at least selectively transparent to a luminous, infrared or ultraviolet radiation, incident thereon on a first incidence surface, wherein in the volume defined by said encoding element there is a plurality of areas, previously selected and arranged according to a predefined pattern wherein is varied at least one distinctive characteristic of an optical radiation that is incident thereon, wherein the variation of said at least one distinctive characteristic of said incident radiation incident thereon is varied according to a localised alteration pattern biunivocally associated to a predefined ciphering key, and wherein said plurality of areas is arranged between said first incidence surface (101) on which said luminous, infrared or ultraviolet radiation is incident in use, and a second output surface (102) of said luminous, infrared or ultraviolet radiation.

The Applicant points out that the term "previously selected" shall be deemed to indicate that the user will be in a position to freely select the position of said areas, but the position can no longer be changed once established, especially following the processing of the encoding element.

According to a further non-limiting aspect of the invention, said distinctive characteristic of said radiation is a polarisation characteristic, and such characteristic is varied according to a localised heating pattern biunivocallly associated to a predefined ciphering key, and wherein said plurality of areas is arranged between said first incidence surface, on which said luminous, infrared or ultraviolet radiation is incident in use, and the second output surface of said luminous, infrared or ultraviolet radiation.

According to a further non-limiting aspect of the present invention, said previously selected areas are areas subjected to a variation of the molecular, polymeric or crystalline structure due to localised heating induced by an external energy source such to determine a variation of the distinctive characteristics of an optical radiation of said luminous, infrared or ultraviolet optical radiation when the latter passes therethrough.

According to a further non-limiting aspect of the present invention, said previously selected areas are visible structural alteration areas.

In particular, the term "visible structural alteration" is used to indicate a modification of the molecular, polymeric or crystalline structure induced by said localised heating, such to be visible to the naked eye upon observing said crystal.

According to a further non-limiting aspect of the present invention, between said first incidence surface—on which said luminous, infrared or ultraviolet radiation is incident in use—and said output surface of said luminous, infrared or ultraviolet radiation, at least one preferential optical path is identified for said luminous, infrared or ultraviolet radiation.

Such preferential optical path advantageously enables identifying a main direction along which said radiation propagates, so that the absorption of the power that said element causes on the incident radiation, is limited especially along such main direction. This advantageously facilitates the "reading" of the element by the photoreceiver.

According to a further non-limiting aspect of the present invention, said encoding element comprises a first material and a second material, wherein said second material has a distinctive frequency spectrum of the known type, and wherein said second material is positioned in the volume identified by said encoding element, at said preferential optical path for said luminous, infrared or ultraviolet radiation.

According to a further non-limiting aspect of the present invention, said spectrum is an emission spectrum. This advantageously applies to materials provided with fluorescence or phosphorescence characteristics.

According to a further non-limiting aspect of the present invention, alternative to the preceding aspect, said spectrum is an absorption spectrum. This advantageously applies to materials not provided with fluorescence characteristics.

According to a further non-limiting aspect of the present invention, in said encoding element said second material:
- is spatially positioned at the previously selected areas, i.e. the areas are realized in the volume of the encoding element through an alteration obtained by heating and subsequently cooling the heterogeneous material or second material; or
- is spatially separated with respect to the previously selected areas; or
- it is positioned in said previously selected areas.

According to a further non-limiting aspect of the present invention, when said second material is present, said encoding element represents a device for encoding unencrypted messages transmitted by means of and/or with luminous, infrared or ultraviolet radiation for the simultaneous alteration of a polarisation angle thereof and a spectral attenuation curve thereof.

According to a further non-limiting aspect of the present invention, between said first incidence surface—on which said luminous, infrared or ultraviolet radiation is incident in use—and said output surface of said luminous, infrared or ultraviolet radiation, a plurality of preferential optical paths is identified for said luminous, infrared or ultraviolet radiation, wherein said plurality of preferential optical paths is equivalent to the number of said areas.

According to a further non-limiting aspect of the present invention, each of said preferential optical paths produces its sub-portion of said output radiation in correspondence of the output surface, wherein said sub-portion has a distinctive polarisation angle.

According to a further non-limiting aspect of the present invention, said plurality of areas is arranged on any from among said conformations, a curve, a line, several lines, several curves.

More in particular, according to a further aspect dependent thereon, said curve/s or line/s appears/appear, if observed on an plane orthogonal with respect to the direction taken by said at least one preferential optical path, in correspondence of the areas themselves.

According to the present invention, a system for transmitting ciphered messages is also provided for, said system comprising:
- at least one encoding element, according to the description above; and
- at least one radiation source, in the infrared, visible or ultraviolet spectrum, arranged in correspondence of said encoding element and having at least one radiation source oriented with respect to said encoding element so as to propagate an incident radiation on at least one surface of said encoding element.

According to a further non-limiting aspect of the present invention, in said system, said radiation source is a source with predefined spectral profile.

This advantageously contributes to greater purity and effectiveness of transmission of the ciphered message, which can thus also be of the time variant type.

More in particular, according to a further non-limiting aspect of the present invention, said radiation source transmits with a substantially temporarily constant radiation.

This is particularly advantageous if a message already in coded form is stored in said encoding element, given that it optimises the quality with which it can be received by the receiver and then decrypted correctly.

Alternatively, according to a further non-limiting aspect of the present invention, said radiation source transmits with a time-variant radiation, wherein said time-variant radiation corresponds to an unencrypted message subsequently ciphered by said encoding element by rotating the polarisation angle of said radiation.

This is particularly advantageous if only a ciphering key is stored in said encoding element, given that the unencrypted message, or message previously pre-encrypted according to a second key, is directly transmitted by the radiation source.

According to a non-limiting embodiment, said radiation source can be a LED emitting in the infrared or ultraviolet or visible spectrum.

According to a further non-limiting aspect of the present invention, said radiation source has a distinctive preferential polarisation angle for said radiation.

According to the present invention, a method is provided for decoding a ciphered message by means of luminous, ultraviolet or infrared radiation, said method providing for a step of arranging one or more photoreceivers at an encoding element as described previously, a step of irradiating a first surface of said encoding element so as to obtain the transmission of an output radiation by said encoding element, and a step of extracting—by means of said photoreceivers—a polarisation angle of said output radiation; said method further comprising a step of comparing said polarisation angle of said output radiation with a ciphering key electronically biunivocally associated with a rotation of said polarisation angle, due to the passing of said radiation through at least said encoding element, wherein the unencrypted message is electronically extracted from said comparative step.

According to a further non-limiting aspect of the present invention, said method comprises a step of arranging one or more photoreceivers according to a predefined spatial configuration.

This is advantageously convenient when the encoding element has several areas distinguished by the aforementioned alteration by heating, given that each i-eth radiation component exiting from the second surface can be treated as a single photoreceiver.

In particular, the number of photoreceivers is equal to the number of areas of said encoding element that were altered as described previously.

According to a further aspect of the present invention, said method further comprises an activation of means for identifying the amplitude as a function of the frequency of said radiation transmitted exiting from said encoding element.

According to the present invention, a receiver is provided, suitable to receive an optical radiation transmitted or received by an element according to any one of the preceding aspects regarding the aforementioned element.

The aforementioned variation can be time-variant or time-invariant.

With the aim of providing further intelligibility of the present invention, the following definitions shall apply:

The term "transparency" is used to indicate a characteristic according to which the material subject of examination can allow a radiation incident thereon to pass along a preferential direction, irrespective of the attenuation that such radiation is subjected to upon passing through said material.

The term "polarisation characteristic" is used to indicate a variation of the distinctive characteristics of an optical radiation including a rotation of the polarisation angle that the radiation exiting from said material subject of examination has with respect to the incident radiation, referred to as a reference polarisation angle.

The term "infrared" is used to indicate an electromagnetic radiation with a wavelength indicatively comprised between 0.7 µm and 15 µm.

The term "visible" or "visible spectrum" is used to indicate an electromagnetic radiation with a wavelength indicatively comprised between 390 and 700 nm.

The term "ultraviolet" is used to indicate an electromagnetic radiation with a wavelength indicatively comprised between 400 nm and 10 nm.

BRIEF DESCRIPTION OF THE DRAWINGS

Some embodiments and some aspects of the invention will be described hereinafter with reference to the attached drawings, provided solely by way of non-limiting example, wherein:

FIG. 1 illustrates a perspective view of an encoding element according to the present invention;

FIG. 2, FIG. 3 and FIG. 4 illustrate front views of the encoding element of FIG. 1, along plane X-Y and along plane X-Z;

DETAILED DESCRIPTION OF THE INVENTION

Figure 5:
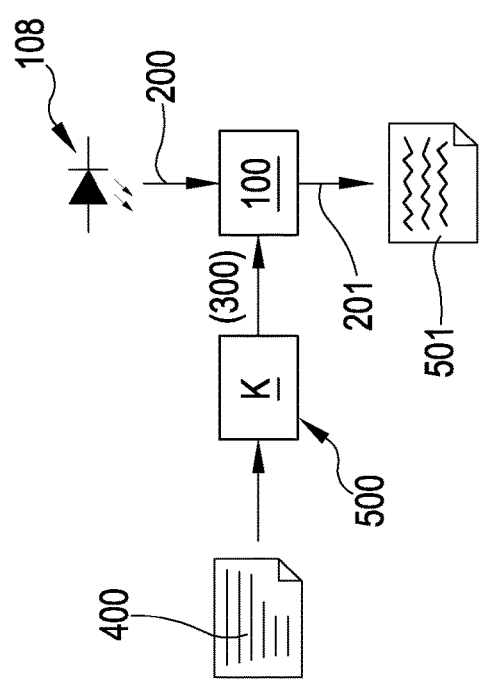
FIG. 5 illustrates a simplified diagram of an alteration of a plurality of areas of said encoding element through a laser which represents an external energy source.
Figure 6:
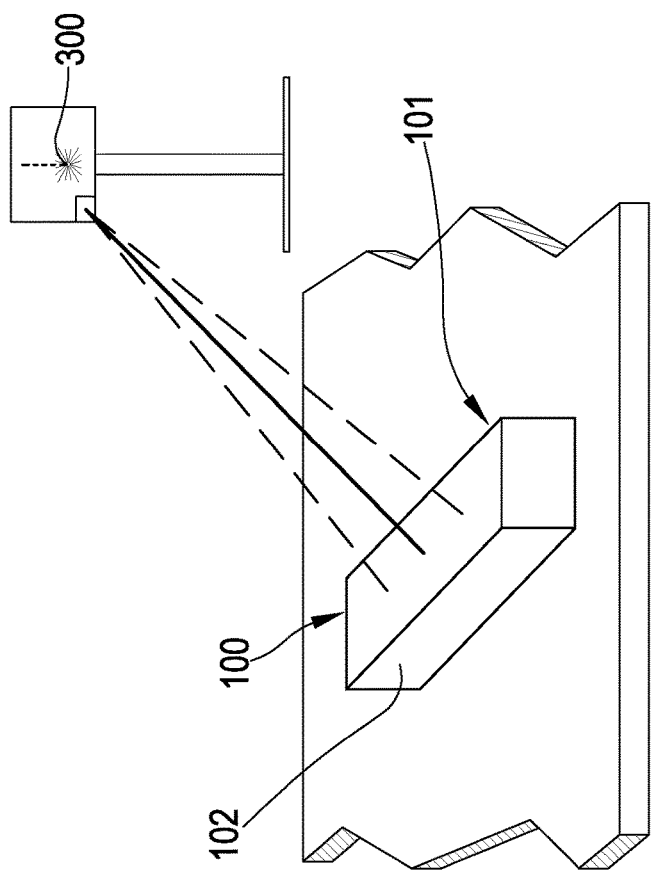
FIG. 6 illustrates a perspective view of the encoding element of FIG. 1, in which three areas are identified, previously subjected to alteration, each one of which causes a distinctive variation of the distinctive characteristics of an optical radiation of the incident radiation.
Figure 7:
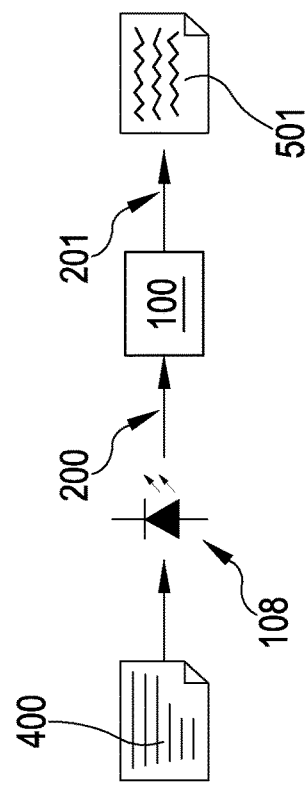
FIGS. 7 and 8 illustrate two principle diagrams of a process for storing a ciphered message in the aforementioned ciphering key and a ciphering key.
Figure 8:
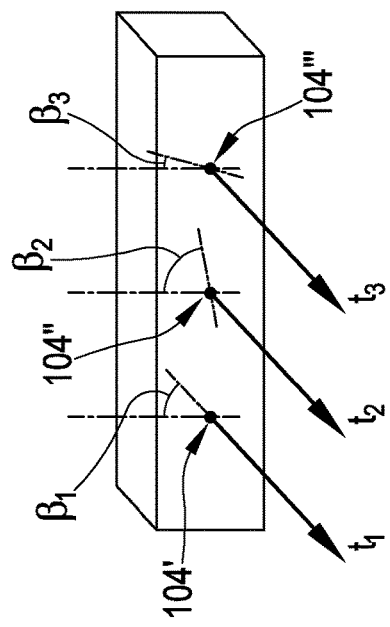

First and foremost, the present invention regards an encoding element 100 at least selectively transparent to a luminous, infrared or ultraviolet radiation.

The encoding element 100 comprises at least one first surface 101 which represents a first input or incidence surface for a radiation 200 and a second surface 102 which represents a second output surface for said radiation 200, which passes—in the volume defined by the encoding element 100—through a preferential optical path 103 defined between the first and second surface 102. Though the preferential optical path 103 is preferably straight, this configuration shall not be deemed to be limiting. As a matter of fact, for particular configurations of the encoding element 100, the first incidence surface and the second output surface of said radiation 200 can coincide. This is particularly the case when obtaining full reflections inside the element. Likewise, though the attached figures show a parallelepiped-shaped encoding element 100 for the sake of simplicity, this geometric configuration shall not be deemed to be limiting. The remaining surfaces besides the first and the second surface 101, 102 can possibly be coated or treated so as to be opaque to the transmission of said radiation 200. The encoding element 100 is a passive element, this meaning that it does not have any autonomous energy source, such as for example a battery, capable of altering the distinctive characteristic of the light radiation.

In the volume defined by the encoding element 100, there is a plurality of areas 104 selected previously and arranged according to a predefined pattern in which a polarisation characteristic of said radiation 200 incident on the first surface 101 is varied. In particular, the variation of said polarisation characteristic of said incident radiation is carried out according to a localised heating pattern biunivocallly associated to a predefined encryption key 500.

The plurality of areas 104, which—by way of non-limiting example—can follow a pattern on a line like in FIG. 3 or for example on several lines like in FIG. 4, is interposed between the first surface 101 and the second surface 102 so that the preferential optical path 103 passes through said plurality of areas 104. More in particular, each area 104 defines a sub-portion of said preferential optical path which has a distinctive polarisation angle of the radiation that exits therefrom. Such polarisation angle can be equal to or different from the polarisation angles taken by the radiation portions of the adjacent areas.

Exiting from the second surface 102 there occurs an output radiation 201 having a plurality of components spatially different from each other. Such output radiation 201 has a number of components equal to the number of areas 104. The entirety of the components of the output radiation 201 transports the ciphered message.

As schematically illustrated in FIG. 4, the areas 104 are subjected to a variation of the molecular, polymeric or crystalline structure due to a localised heating induced by an external energy source 300; in particular, the alteration induced on said areas is such to determine a variation of the distinctive characteristics of an optical radiation 200, in particular a variation of the polarisation angle, of the luminous, infrared or ultraviolet radiation 200 when it passes therethrough. Such alteration is an alteration of the polarisation characteristics. Even more in particular, the variation of the polarisation angle is a time-variant rotation $\varphi_i$ of the polarisation angle taken by the radiation that is incident on the first surface 101 of the encoding element 100. Index i is due to the fact that each area 104 may have a distinctive, i-eth, rotation of the polarisation angle of the incident radiation. The aforementioned radiation is transmitted by a radiation source 108 which preferably has a polarisation angle of the predefined radiation. Such radiation source 108 may preferably but not limitedly comprise one or more LED diodes which even more preferably have a radiation mainly oriented along a reference polarisation angle.

In particular, the radiation source 108 is a radiation source which comprises a plurality of emitters arranged according to the pattern of the selected areas 104 when the encoding element is associated to the aforementioned source 108, which is part of a system for transmitting ciphered messages by means of infrared, ultraviolet or visible radiation which comprises the aforementioned source 108, a medium for the encoding element 100 such to make the latter at least temporarily integrally joined with the source 108, and appropriate power supply means for the source 108, in which an electrical signal corresponding to an unencrypted message 400 can be made to pass through.

The external energy source 300 is preferably a laser, suitably configured and controlled so as to be positioned in a specific initial position with respect to the encoding element 100, and subsequently directed towards predetermined zones of said encoding element in a manner such to cause a localised and temporary increase of the temperature thereof, which—despite decreasing subsequently—leaves room for a permanent alteration of the molecular, polymeric or crystalline structure of the encoding element. Thus, the process for obtaining the areas 104 provides for, as concerns each area 104, a heating induced by the external energy source 300 followed by a subsequent cooling step. Such cooling may occur naturally or it can be accelerated by cooling means of the known type. Using a laser as an external energy source 300 can advantageously enable considerable heating precision on extremely small areas, substantially dot-like, with ensuing precision for indirect definition of the variation of the polarisation angle of the incident radiation. Depending on the method for obtaining the aforementioned areas 104, several lasers may be provided activated simultaneously so as to have respective beams corresponding in points inside the volume defined by said encoding element 100; the areas 104 are obtained in the corresponding points. The Sub-Surface Laser Engraving (SSLE) technique can be utilised for instance.

In particular, the variation of the polarisation angle of the radiation 200 that is incident ion the first surface 101 can be expressed in terms of leftward or rightward angular rotation of the polarisation of the radiation 200, for example and not limitedly in association with a reference polarisation angle. The reference polarisation angle is preferably but not limitedly measured on the polarisation of the electric field of the electromagnetic wave of the radiation.

The encoding element 100 is for example made of glass, or alternatively any other polymeric plastic material transparent to the visible, infrared or ultraviolet radiation and it is capable of altering the polarisation angle of such radiation 200 following the process described previously. Poly(methyl methacrylate) is a non-limiting example of such material.

The alteration caused by the external energy source 300 is preferably invisible so as to leave the aesthetic appearance of the encoding element 100 unaltered. However, such characteristic shall not be deemed to be limiting, given that energy can be injected into the encoding element 100 through the external energy source 300 with a structural alteration visible to the human eye, for example with the formation of micro-bubbles. In this case, it is possible to obtain particular aesthetic shapes enclosed in the volume of the aforementioned element, which—besides the aesthetic functions—also has the function of varying the aforementioned polarisation angle.

The pattern by means of which the aforementioned alteration is obtained is biunivocallly associated to a key 500 for ciphering an unencrypted message, or an ciphered message 501 alternatively, by means of the aforementioned ciphering key 500. In other words, the plurality of areas heated selectively so as to modify the capacity thereof to vary the polarisation angle of the radiation incident thereon, can permanently store either an unencrypted message or a ciphering key. Thus, the encoding element 100 enables obtaining either a key for encoding messages or a physical medium for the ciphered messages.

For example, in the volume of the encoding element 100, three areas 104', 104", 104''' are defined, each associated to a rotation $\varphi_1$, $\varphi_2$, $\varphi_3$ of the polarisation angle of the incident radiation 200. By way of non-limiting example, there could be $\varphi_1$, $\varphi_2$, $\varphi_3$ so that the polarisation angle $\beta_1$ of the radiation 201 exiting from the second surface 102 is equivalent to 30°, the polarisation angle $\beta_2$ of the radiation 201 exiting from the second surface 102 is equivalent to 60° and the polarisation angle $\beta_3$ pf the radiation 201 exiting from the second surface 102 is equivalent to 70°. If $\beta_1$, $\beta_2$, $\beta_3$ set identifies a ciphering key, the radiation transmitted by the encoding element 100 at the second surface 102 thereof will have three components $t_1$, $t_2$, $t_3$ which "carry" a ciphered message 501. If the source 108 of the radiation 200 is time-variant, the encoding element 100 enables obtaining an encoding key so as to be able to cipher the unencrypted message 400, of the time-variant type in turn. Generalising this concept, given N portions or areas 104, the $\beta_i$, i=1 ... N set identifies a ciphering key, and the radiation 201 exiting from the second surface will have $t_i$, i=1, . . . , N components, each one of which has a part of the ciphered message.

The applicant advantageously observed that given materials have the ability to rotate the rotation angle of the radiation 200 incident thereof which also depends on the orientation of the material with respect to the aforementioned radiation. Thus, suitably rotating the encoding element 100 enables using the same or a copy thereof to decrypt the aforementioned ciphered message, in particular by exploiting the inversion and/or subtraction the rotation of the polarisation angle added previously.

The element 100 subject of the present invention enables obtaining a system for ciphering and deciphering messages, wherein said messages are messages transmitted by means of luminous, infrared or ultraviolet radiation, wherein on the receiver side a photoreceivers 601 is present, alternatively replaced by a plurality of suitably combined photoreceivers 601, configured so as to be able to encode said ciphered message which is indirectly transmitted by means of said encoding element 100. In particular if single the photoreceiver 601 must be capable of simultaneously receiving several spatially different components of a luminous, infrared or ultraviolet radiation, altered in terms of polarisation angle; otherwise, knowing the spatial configuration or pattern of the areas selectively heated by the external energy source 300, one can arrange a plurality of photoreceivers 601 according to a spatial separation of the areas in said pattern, so as to be able to receive each single altered portion of radiation 200 on a single photoreceiver 601.

The photoreceiver 601 or the photoreceivers 601 convert the radiation transmitted through the encoding element 100 into an electrical signal which advantageously comprises as many components as the areas of the aforementioned pattern. The electrical signal exiting from the photoreceivers is processed by a data processing unit 602 which loads the key for decrypting the ciphered message from a memory 603.

The photoreceiver 601 or the photoreceivers 601 must be capable of distinguishing the polarisation angle of the received radiation and they optionally must be capable of distinguishing the amplitude thereof.

Figure 9:
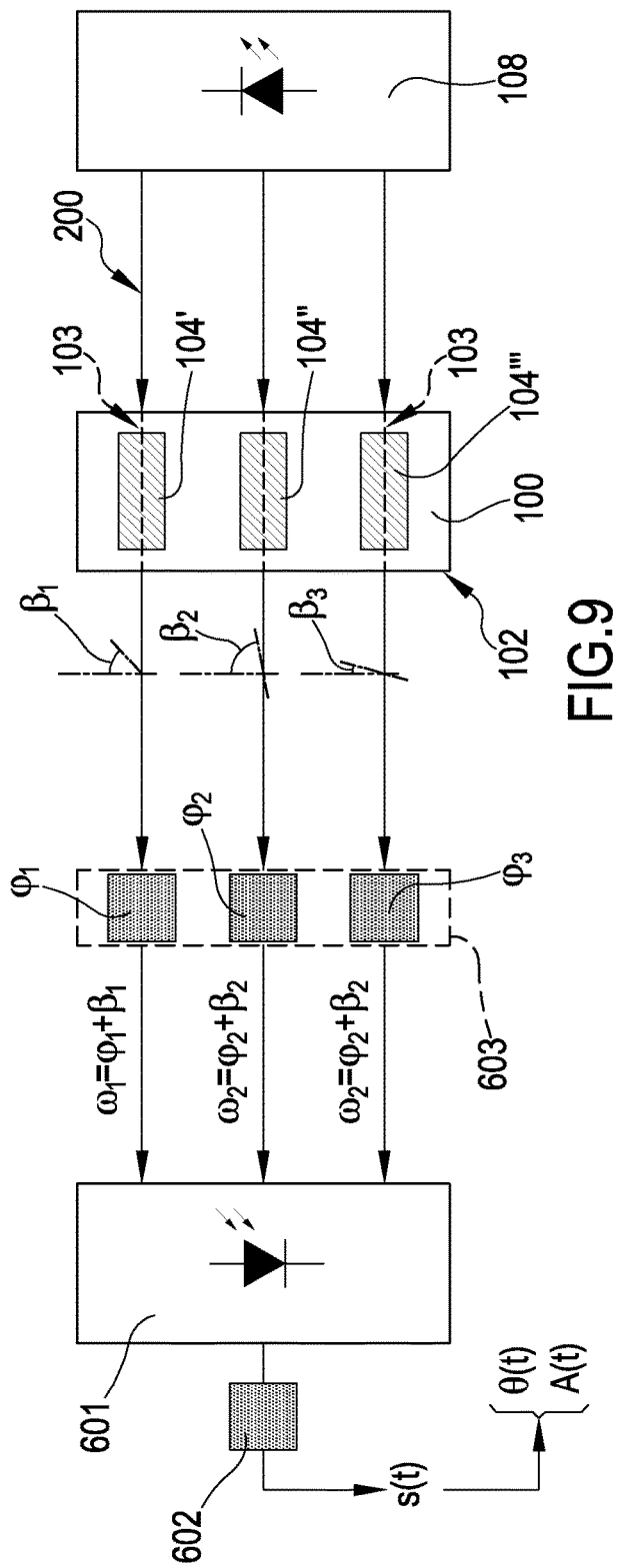
FIG. 9 illustrates a simplified diagram of a system for ciphering and deciphering messages by means of said encoding element.

In a further embodiment of the invention, the system further comprises a polarisation filter 603 interposed between the encoding element 100 and the photoreceiver 601 or the photoreceivers 601. Given that the presence of the polarisation filter 603 is optional, it is represented in a dashed manner. Depending on the type of filter, there may occur a first situation in which some portions of radiation 201 exiting from the second surface 102 of the encoding element 100 are attenuated with respect to others, or still that such portions are further rotated in terms of polarisation angle with respect to the angle taken exiting from the second surface 102. Such configuration is illustrated in FIG. 9 where it is observable that in this case the polarisation filter 603 has a plurality of portions numerically equal to the number of areas 104, each of which has a distinctive rotation angle φ with respect to the polarisation angle of the radiation 201 exiting from the second surface 102. More in particular, each i-eth portion of the aforementioned polarisation filter 603 has a rotation angle $\varphi_i$ with respect to the polarisation angle such that the polarisation angle $\omega_i$ pf the i-eth component of the radiation exiting from the polarisation filter 603 underlies the $\omega_i = \varphi_i + \beta_i$ law.

Figure 10:
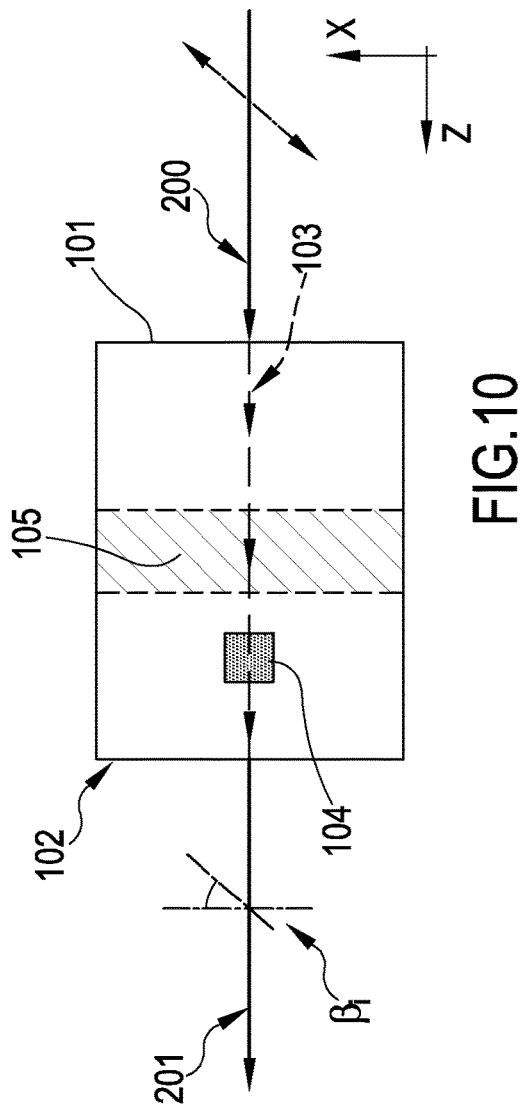
FIG. 10 illustrates a view of an alternative embodiment of the encoding element subject of the present invention along plane XZ.

The applicant also observed that a second or alternative ciphering key can be associated. Such second or alternative ciphering key is an addition or—depending on the embodiment actually implemented—or a replacement with respect to the first key consisting of the variation of the polarisation characteristic described previously and applied to the areas 104. Such second ciphering key can be obtained by means of a step of processing the encoding element 100 wherein, in said preferential optical path 103 there is at least one layer of heterogeneous material or second material with respect to the material that the encoding element 100 is made of. FIG. 10 illustrates a schematic representation of the encoding element 100, in which there can be observed a layer of heterogeneous material or second material 105 present at the preferential optical path. Such layer of heterogeneous material or second material, alternatively:

- is spatially positioned at the areas 104, i.e. the areas 104 are obtained in the volume of the encoding element 100 through an alteration obtained by heating and subsequently cooling the heterogeneous material or second material 105; or
- is spatially separated with respect to the areas 104, or still should the key obtained from said second material be entirely alternative to the first ciphering key obtained from the variation of the polarisation characteristic of the optical radiation, it is obtained directly in the areas 104.

Such heterogeneous material or second material has a distinctive spectrum for the transmission of the luminous, infrared or ultraviolet radiation, which advantageously is not constant in terms of frequency; the amplitude—attenuation—of the radiation transmitted through such material, expressed in the frequencies domain represents the function of transferring the material, or a spectrum curve.

In particular the Applicant observed that the second material that is utilised can be a phosphorescent or fluorescent material, thus with a distinctive emission spectrum which can be energised by the radiation transmitted by the optical radiation source. The spectrum of said second material may alternatively be a conventional absorption spectrum.

Thus, the radiation 201 exiting from the second surface 102 has a selective attenuation function of the frequency, expressed by the transmission curve of the radiation own of the aforementioned heterogeneous material or second material with respect to the material that the encoding element 100 is made of. By way of non-limiting example, such heterogeneous material or second material may comprise chlorophyll.

Thus, the transfer function carried out by the encoding element 100 is represented by H(f); the mask stored in the memory alternatively comprises either H(f) or $H^{-1}(f)$. Should an alteration of the polarisation angle $\omega_i$ also be present as outlined above the element subject of the invention will further combine an alteration of the polarisation characteristics of the radiation too with the spectrum variation of the transmitted optical radiation.

Should the photoreceivers 601 have the capacity to distinguish the incident radiation frequencies, and thus provide—in output—an electrical signal s(t) of the type:

$$s(t): \left\{ \begin{array}{c} \vartheta(t) \\ A(f) \end{array} \right\}$$

thus transported the information regarding a polarisation angle $\vartheta$—possibly variable over time—of the received radiation, and a spectral characteristic, one can configure the aforementioned data processing unit so that it can retrieve an attenuation mask H(f) or $H^{-1}(f)$ too from the memory as a function of the frequency univocally associated to the specific material of the heterogeneous material or second material type and more preferably univocally associated to the encoding element 100 including the aforementioned heterogeneous material or second material 105, and decode the aforementioned ciphered message also as a function of the selective attenuation of the aforementioned material with distinctive frequency. It is advantageously impossible to retrace the attenuation curve generated by the material and thus equally impossible to decode the information transported through the selective attenuation of the radiation as a function of the frequency without knowing which heterogeneous material or second material contained in the preferential optical path 103 of the encoding element 100. In order tom optimise such function, the radiation source 108 advantageously has an emission spectrum of the known type. Such emission spectrum is even more preferably of the white light type.

In this case, the process of sending the ciphered message comprises a step of irradiating the first surface 101 of the aforementioned encoding element 100 with an incident radiation 200 having a frequency spectrum preferably of the known type and, if altered as described previously, further characterised by a distinctive polarisation angle, wherein when passing along the preferential optical path 103 the radiation 200 encounters the heterogeneous material or second material 105 and varies its spectral curve according to the frequency filter function obtained by the heterogeneous material or second material, it being further subjected to the alteration of the polarisation angle induced by passing through the area 104.

In the receiving step, the photoreceiver or photoreceivers 601 receive the radiation exiting from the second surface 102 of the encoding element 100, with or without interposing the polarisation filter 603 as described previously and identify the polarisation angle or angles thereof for each i-eth component and the amplitude as a function of the frequency by means of the data processing unit. When, as concerns the frequencies spectrum in question the amplitude as a function of the frequency is extracted, the step of the electronic comparison of the received radiation spectrum with the mask previously stored in the memory is carried out with the aim of extracting the spectrum of the radiation 201 exiting from the encoding element 100.

The electronic comparison process preferably but not limitedly comprises a step of applying the inverse of the distinctive attenuation curve of the heterogeneous material or second material 105.

To summarise, irrespective of the alteration of the optical radiation characteristic that is engraved on a surface of the element 100—such characteristic being an alteration of the polarisation or an alteration of the optical radiation spectrum, in receipt there is a step of extracting the information to obtain the message transmitted initially through the element 100. Such extraction step is a step carried out electronically, i.e. using a computer. Depending on the configuration of the element 100, the message can be extracted—thus, decrypted—based on the variation of the polarisation angle or the spectrum characteristics for transmitting the radiation transmitted through the element 100.

Parts of the process or method described in the present invention can be—where possible—carried out by means of a data processing unit, which can be technically replaced with one or more computers conceived to execute a portion of a software or firmware program predefined and loaded in a non-transitory storage medium. Such software program can be written in any known programming language. If two or more, the computers can be connected to each other through a data connection such that the computing capacity thereof is shared in any manner; thus, the computers can even be installed in geographically different positions.

The data processing unit can be a general-purpose processor specifically configured by means of said software or firmware program to perform one or more parts of the method identified in the present invention, or it can be an ASIC or a dedicated processor, specifically programmed to perform at least part of the operations of the method or process of the present invention.

The non-transitory storage medium for storing the aforementioned portion of software or firmware programme can be internal or external with respect to the processor, possibly also external with respect to the computer, and it specifically can be a memory geographically remotely located with respect to the computer. The storage medium can also be physically split, in form of "cloud". The term "non-transitory" is used to indicate a computer-readable storage medium, in which data storage is temporarily maintained for a predefined but variable time based on the power supply and/or environmental condition, and it is a tangible medium. The aforementioned definition of the "non-transitory" storage medium excludes media such as for example the atmosphere, or an electrically conductive medium or a light conductor—such as optical fibre—in which an electromagnetic signal, regardless of the form thereof, transits for a for a non-zero time period due to the limited and not infinite signal propagation speed on the medium.

Lastly, it is clear that the object of the present invention can be subject of additions, modifications, or variants obvious to a man skilled in the art, without departing from the scope of protection which is outlined by the attached claims.

The invention claimed is:

1. A data ciphering method, said method comprising:
a step of generating a localised alteration pattern of one or more selected areas of an encoding element at least selectively transparent to luminous, infrared or ultraviolet radiation;
a step of processing said encoding element at least selectively transparent to luminous, infrared or ultraviolet radiation, wherein in said step of processing the selected areas of said at least selectively transparent encoding element are selectively altered according to said localised alteration pattern, and wherein, with said selective alteration of said selected areas is varied a distinctive characteristic of an optical radiation incident and passing through said encoding element,
said step of processing leading to a permanent modification of the characteristic of said element such to obtain a storing of a ciphered message or a ciphering key for an unencrypted message; and
a step of irradiating said encoding element with a luminous, infrared or ultraviolet radiation incident on said encoding element at a first input surface, so that this optical radiation passes in the encoding element through at least one of said areas, up to a second output surface.

2. The method of claim 1, wherein said varied distinctive characteristic of said incident optical radiation is a polarisation characteristic.

3. The method of claim 1, wherein said distinctive characteristic of said incident optical radiation that is varied, is a spectrum characteristic.

4. The method of claim 1, further comprising:
a step of generating a ciphering key for an unencrypted message; and a step of allocating a biunivocal association of said ciphering key to said localized alteration pattern of one or more selected areas of said encoding element.

5. The method of claim 1, wherein said selective alteration of said selected areas comprises a step of heating at least one area fully located within the volume defined by said encoding element at least selectively transparent to luminous, infrared or ultraviolet radiation.

6. The method of claim 1, further comprising a step of ciphering said unencrypted message by means of a predefined ciphering algorithm, using said ciphering key.

7. The method of claim 1, wherein said processing step comprises a step of localized heating of said areas by means of at least one laser wherein optionally said heating determines a modification of the distinctive characteristics of the material which causes a variation of the polarisation characteristics of the optical radiation that passes through said at least one area and/or wherein said pattern is a localised alteration pattern and defines a pattern of a plurality of points of variation of said distinctive characteristic of the optical radiation that is incident and passing through said encoding element at least selectively transparent in at least one first direction defining a preferential optical path between said first and said second surface, respectively of input and output and/or said localised alteration pattern is defined based on the amount of energy injected into said selected areas and/or as an injection volume pattern of said amount of energy.

8. The method of claim 7, comprising the step of processing the aforementioned encoding element so that in the volume defined by the latter, and in particular along at least one preferential optical path, a second different material is present with respect to the material that the remaining part of said encoding element is made of, said different material or second material having a distinctive radiation transmission curve or spectrum and wherein this further processing step leads to the fact that the radiation exiting from the second surface of said encoding element simultaneously has:
an alteration of the polarization angle; and
an alteration of the frequency spectrum thereof, in accordance with the transmission, absorption or emission, radiation curve of said second material of a different type with respect to the remaining material of said encoding element.

9. The method of claim 1, comprising the step of arranging said encoding element along a first direction so that the variation of the polarisation characteristics of the light is reversible when said element is arranged along an opposite direction with respect to the first direction, and said processing step is carried out so that said pattern of said plurality of variation points of said polarisation characteristic of said optical radiation that is incident and passing through said at least selectively transparent encoding element is spatially oriented according to said arrangement.

10. A method of deciphering data contained in a ciphered message, said method comprising:
a step of arranging an encoding element having a plurality of areas with a varied distinctive characteristic of an incident optical radiation and/or varying a distinctive characteristic of an optical radiation incident thereon, wherein said varied distinctive characteristic of an incident optical radiation is previously defined based on a localized alteration pattern of said element with a biunivocal association with a ciphering key of an unencrypted message on a known cyphering function, in correspondence of a source of a luminous, ultraviolet or infrared optical radiation, in a position such that said optical radiation, by being incident on the surface of said encoding element, passes through said plurality of areas with a varied distinctive characteristic of incident optical radiation, producing in output of said encoding element a message ciphered under electromagnetic radiation;
a step of arranging at least one photoreceiver in a direction for propagating said radiation through said encoding element, wherein said photoreceiver element is configured so as to directly or indirectly perceive at least one variation of the distinctive characteristic of said radiation at said areas with a varied distinctive characteristic of an incident optical radiation and/or varying a distinctive characteristic of an optical radiation incident thereon; and
a step of extracting information from the radiation exiting from said encoding element based on a reconstruction of said alteration.

11. The method of claim 10, wherein said extraction step comprises:
a step of extracting, by means of said at least one photoreceiver a polarisation angle $\omega_i$ of said radiation exiting from said encoding element, wherein said polarisation angle $\omega_i$ is associated with said ciphered unencrypted message, said extraction step corresponding to a step of decrypting said ciphered message associated with said radiation exiting from said encoding element.

12. The method of claim 10, further comprising a step of comparing said polarization angle of said radiation exiting from said encoding element with a ciphering key electronically biunivocally associated with a rotation $\varphi_i$ of said polarisation angle, due to the passing of said radiation through at least said encoding element, wherein the unencrypted message is electronically extracted from said comparative step.

13. The method of claim 10, comprising a step of lighting said encoding element with a radiation source emitting on a wavelengths spectrum with a predefined profile and/or comprising a step of interposing at least one polarisation filter between said at least one photoreceiver and said encoding element and/or comprising a step of the spectroscopic analysis of said radiation that is incident on said at least one photoreceiver; said step of decrypting said ciphered message transmitted with said light radiation, comprising a step of applying a comparison of at least one set of predefined spectroscopic patterns on the spectroscopic pattern received from said at least one photoreceiver, in order to obtain said unencrypted message.

14. An encoding element, at least selectively transparent to a luminous, infrared or ultraviolet radiation in use incident thereon the encoding element comprising a first incidence surface and a second output surface for said luminous, infrared or ultraviolet radiation, wherein in the volume defined by said encoding element there is a plurality of areas previously selected and arranged according to a predefined pattern wherein in said plurality of areas at least one distinctive characteristic of the radiation that is incident thereon is varied, and wherein the variation of said distinctive characteristic of said radiation is carried out according to a localised alteration pattern biunivocally associated to a predefined ciphering key, and wherein said plurality of areas is arranged between said first incidence surface and said second output surface.

15. The element of claim 14, wherein said previously selected areas are areas subjected to a variation of the molecular, polymeric or crystalline structure for a localised heating induced by an external energy source such to determine a variation of the polarisation angle of said luminous, infrared or ultraviolet optical radiation when the latter passes therethrough.

16. The element of claim 14, wherein between said first incidence surface—on which said luminous, infrared or ultraviolet radiation is incident in use—and said output surface of said luminous, infrared or ultraviolet radiation, is identified at least one preferential optical path for said luminous, infrared or ultraviolet radiation,
wherein the encoding element comprises a first material and a second material, wherein said second material has a frequency attenuation curve of the known type, and wherein said second material is positioned in the volume identified by said encoding element, in correspondence of said preferential optical path for said luminous, infrared or ultraviolet radiation, and
wherein in said encoding element, said second material;
is spatially positioned at the previously selected areas, i.e. the areas are obtained in the volume of the encoding element through an alteration obtained by heating and subsequently cooling the heterogeneous material or second material; or
is spatially separated with respect to the previously selected areas; or
is positioned in said previously selected areas,
said encoding element representing a device for encoding unencrypted messages transmitted by means of and/or with luminous, infrared or ultraviolet radiation for the simultaneous alteration of a polarisation angle thereof and a spectral attenuation curve thereof.

17. The element of claim 14, wherein between said first incidence surface—on which said luminous, infrared or ultraviolet radiation is incident in use—and said output surface of said luminous, infrared or ultraviolet radiation, a plurality of preferential optical paths is identified for said luminous, infrared or ultraviolet radiation, wherein said plurality of preferential optical paths is equivalent to the number of said areas,
wherein each of said preferential optical paths produces its sub-portion of said output radiation in correspondence of the output surface, wherein said sub-portion has a distinctive polarisation angle,
and/or wherein said plurality of areas is arranged on any from among said conformations: a curve, a line, several lines, several curves, wherein said curve/s or line/s appears/appear at the areas if observed on an orthogonal plane with respect to the direction taken by said at least one preferential optical path.

* * * * *